# (12) United States Patent
Hsu (10) Patent No.: US 10,336,386 B2
(45) Date of Patent: *Jul. 2, 2019

(54) SADDLE DEVICE

(71) Applicant: Hsin-Hsiang Hsu, Changhua (TW)

(72) Inventor: Hsin-Hsiang Hsu, Changhua (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,823

(22) Filed: Aug. 25, 2017

(65) Prior Publication Data

US 2018/0304948 A1 Oct. 25, 2018

(30) Foreign Application Priority Data

Apr. 19, 2017 (TW) .............................. 106113091 A (51) Int. Cl.
| | | |
|---|---|---|
| *B62J 1/10* | (2006.01) | |
| *B62J 1/00* | (2006.01) | |
| *B62J 1/08* | (2006.01) | |
| *B62J 1/28* | (2006.01) | |
| *B62J 9/00* | (2006.01) | |
| *B62J 9/02* | (2006.01) | |

(52) U.S. Cl.
CPC .................. *B62J 1/10* (2013.01); *B62J 1/005* (2013.01); *B62J 1/007* (2013.01); *B62J 1/08* (2013.01); *B62J 1/28* (2013.01); *B62J 9/006* (2013.01); *B62J 9/02* (2013.01)

(58) Field of Classification Search
CPC ..... B62J 1/10; B62J 1/005; B62J 1/007; B62J 1/28; B62J 9/006; B62J 9/02
See application file for complete search history.

(56) References Cited

U.S. PATENT DOCUMENTS

| | | | | | |
|---|---|---|---|---|---|
| 1,240,587 | A | * | 9/1917 | Mesinger ............. | B60N 2/2227 297/215.12 |
| 1,380,935 | A | * | 6/1921 | Speer ......................... | B62J 1/28 297/215.12 |
| 4,512,608 | A | * | 4/1985 | Erani ....................... | B62J 1/005 297/195.12 |
| 4,877,286 | A | * | 10/1989 | Hobson ..................... | B62J 1/002 297/215.13 |
| 4,978,167 | A | * | 12/1990 | Harvey ....................... | B62J 1/28 280/288.4 |
| 6,402,236 | B1 | * | 6/2002 | Yates ........................ | B62J 1/005 297/201 |
| 7,131,691 | B2 | * | 11/2006 | Ziegler ...................... | B62J 1/12 297/215.12 |
| 7,628,451 | B2 | * | 12/2009 | Chuang .................... | B62J 1/005 297/201 |

(Continued)

*Primary Examiner* — Philip F Gabler
(74) *Attorney, Agent, or Firm* — Birch, Stewart, Kolasch & Birch, LLP (57) ABSTRACT

A saddle device includes a first seat unit having a front mounting portion and a rear mounting end portion, a saddle unit having a front end edge unit and a top surface unit, and an elongate backrest including two spaced-apart long sides, and two spaced-apart short sides that are connected between the long sides, and removably mounted to a selected one of the front mounting portion and the rear mounting portion such that, when the backrest is mounted to the front mounting portion, at least one of the short sides is located in front of the front end edge unit, and when the backrest is mounted to the rear mounting end portion, at least one of the long sides is located above the top surface unit.

9 Claims, 12 Drawing Sheets

(56) References Cited

U.S. PATENT DOCUMENTS

| | | | | |
|---|---|---|---|---|
| 8,011,725 B2* | 9/2011 | Andrews | ............ | B62J 1/28 |
| | | | | 297/215.1 |
| 8,500,195 B2* | 8/2013 | Smith, II | ............ | B62J 1/28 |
| | | | | 297/215.11 |
| 8,905,474 B2* | 12/2014 | Parvey | ............ | B62J 1/00 |
| | | | | 297/188.02 |
| 9,056,642 B2* | 6/2015 | Onyeka | ............ | B62J 1/005 |
| 9,493,203 B2* | 11/2016 | Portz | ............ | B62J 1/005 |
| 9,663,166 B2* | 5/2017 | Hamel | ............ | B62J 1/007 |
| 10,106,217 B1* | 10/2018 | Hsu | ............ | B62J 1/10 |
| 2006/0244291 A1* | 11/2006 | Buell | ............ | B62J 1/28 |
| | | | | 297/215.12 |
| 2018/0304947 A1* | 10/2018 | Hsu | ............ | B62J 1/10 |

\* cited by examiner

FIG.12

SADDLE DEVICE

CROSS-REFERENCE TO RELATED APPLICATION

This application claims priority of Taiwanese Patent Application No. 106113091, filed on Apr. 19, 2017.

FIELD

The disclosure relates to a bicycle member, and more particularly to a saddle device that is mounted to a bicycle frame.

BACKGROUND

A conventional saddle device disclosed in U.S. Pat. No. 694,875 includes a bottom seat, a shaft rod mounted to the bottom seat, and two saddles threadedly connected to the shaft rod. Each of the saddles has a front end portion, and a rear end portion opposite to the front end portion, and disposed for mounting the shaft rod. Two ends of the shaft rod respectively have a right-handed thread section and a left-handed thread section. The saddles are respectively and threadedly connected to the right-handed thread section and the left-handed thread section of the shaft rod.

When the shaft rod rotates, the right-handed thread section and the left-handed thread section cooperate to drive a relative movement between the saddles for adjusting a distance between the saddles.

Even if the conventional saddle device can adjust the distance between the saddles, for most of bicycles, a portion of a bicycle for mounting the saddles is fixed such that, the positions of the saddles in a front-rear direction are not adjustable for different users.

In addition, the conventional saddle device disclosed in U.S. Pat. No. 694,875 does not include a backrest structure for supporting the back of a user. When the backrest structure is mounted to the conventional saddle device, supporting members are required to be disposed, and the complexity of the conventional saddle device will be increased.

Moreover, the user usually requires some repair tools and repair members for repairing the bicycle, and usually needs to bring a wallet, since the structure of the bicycle frame is simple, it is difficult to mount a bag on a bicycle frame near a saddle portion of the bicycle for receiving the repair tools, the repair members and the wallet, and the conventional saddle device disclosed in U.S. Pat. No. 694,875 does not include a coupling structure for mounting a saddle bag.

SUMMARY

Therefore, the object of the disclosure is to provide a saddle device that can alleviate at least one of the aforesaid drawbacks of the prior arts.

According to the disclosure, the saddle device includes a first seat unit, a second seat unit, a saddle unit and an elongate backrest. The first seat unit has a track portion extending in a front-rear direction, a front mounting portion disposed in front of the track portion, and a rear mounting end portion located opposite to the front mounting portion in the front-rear direction, and located behind the track portion. The second seat unit is mounted to and disposed behind the first seat unit, and is movable on the first seat unit in the front-rear direction. The saddle unit is mounted to the second seat unit, and has a front end edge unit and a top surface unit. The backrest is removably mounted to a selected one of the front mounting portion and the rear mounting portion, and includes two long sides, and two short sides connected between the long sides. When the backrest is mounted to the front mounting portion, the short sides are spaced apart from each other in the front-rear direction, and at least one of the short sides is located in front of the front end edge unit of saddle unit. When the backrest is mounted to the rear mounting end portion, the long sides are spaced apart from each other in a top-bottom direction which is perpendicular to the front-rear direction, and at least one of the long sides is located above the top surface unit of the saddle unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
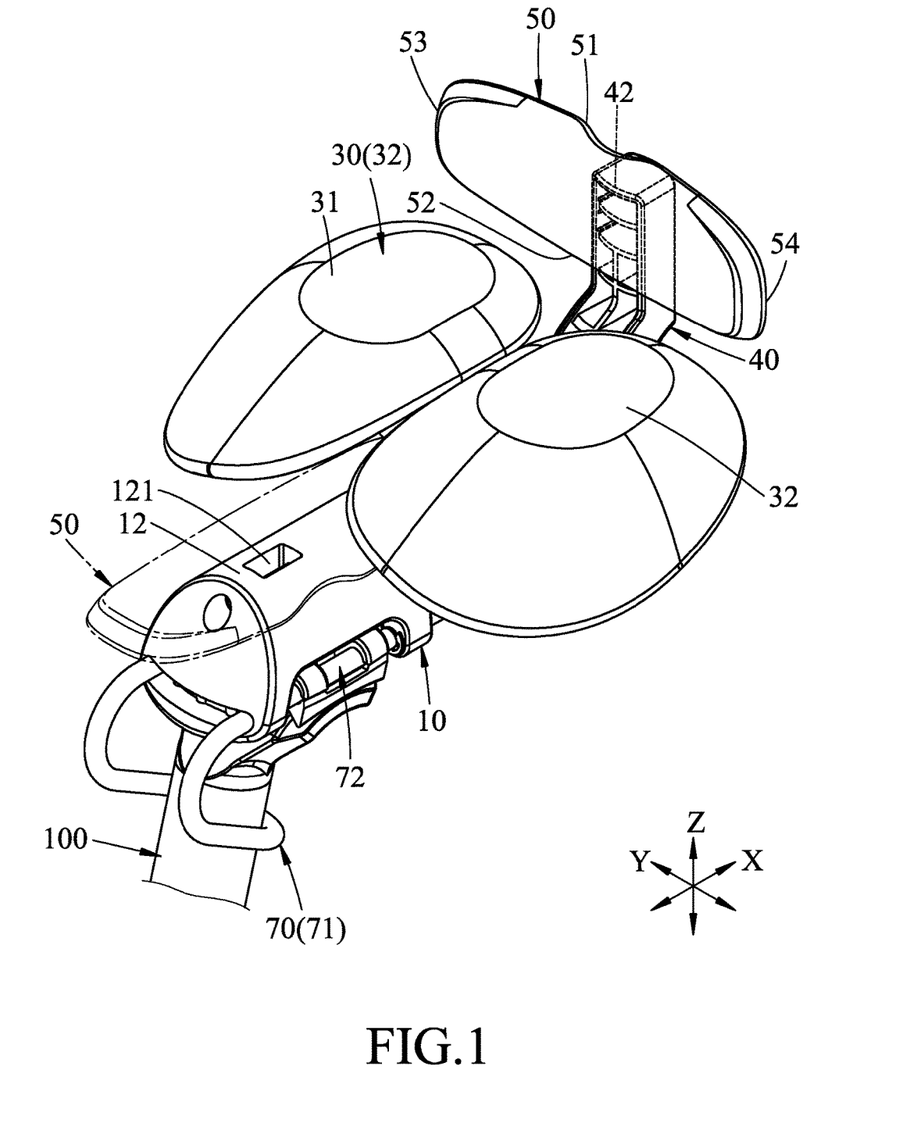
FIG. 1 is a perspective view of a first embodiment of a saddle device according to the disclosure.
Figure 2:
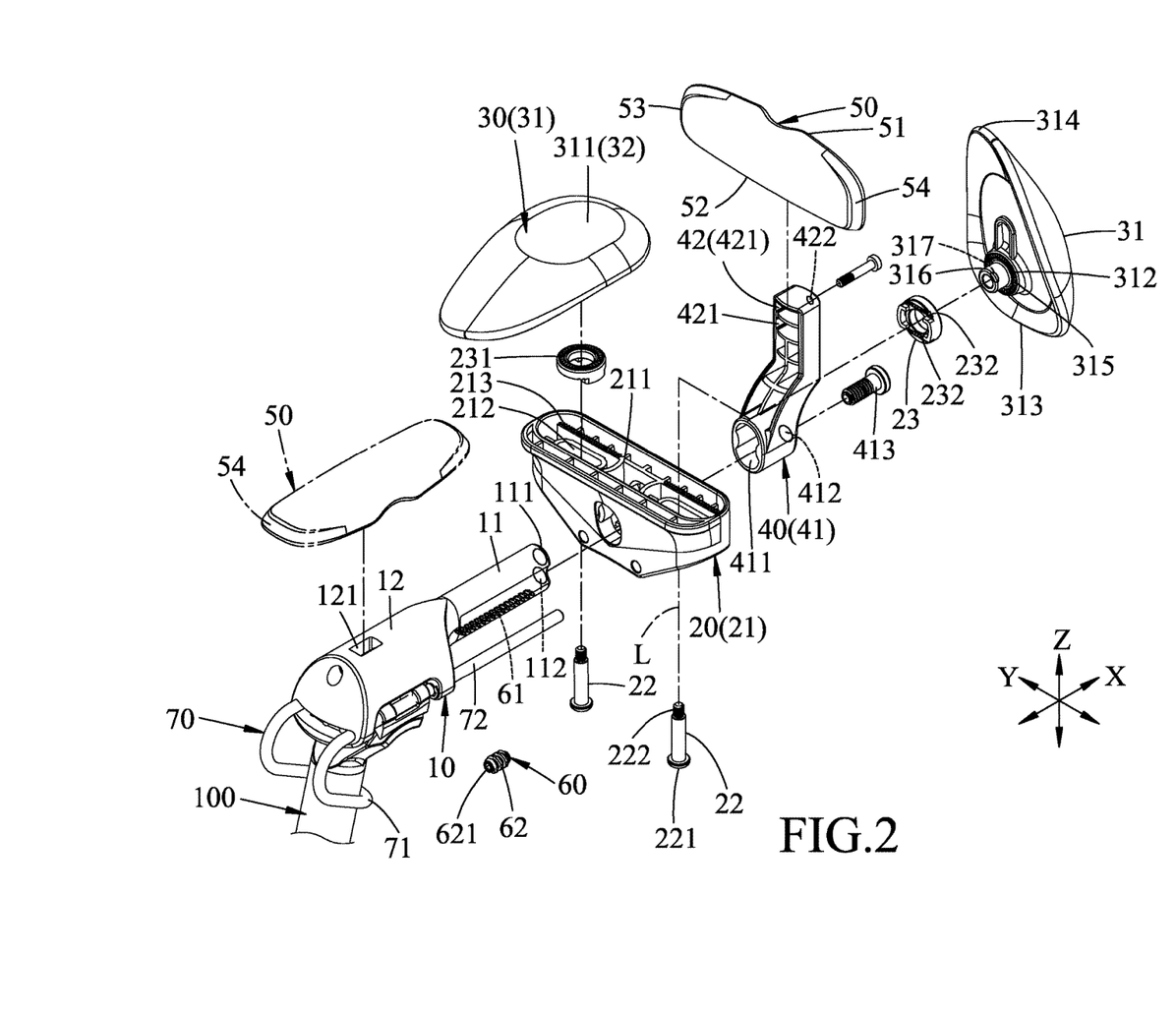
FIG. 2 is a partly exploded perspective view of the first embodiment.
Figure 3:
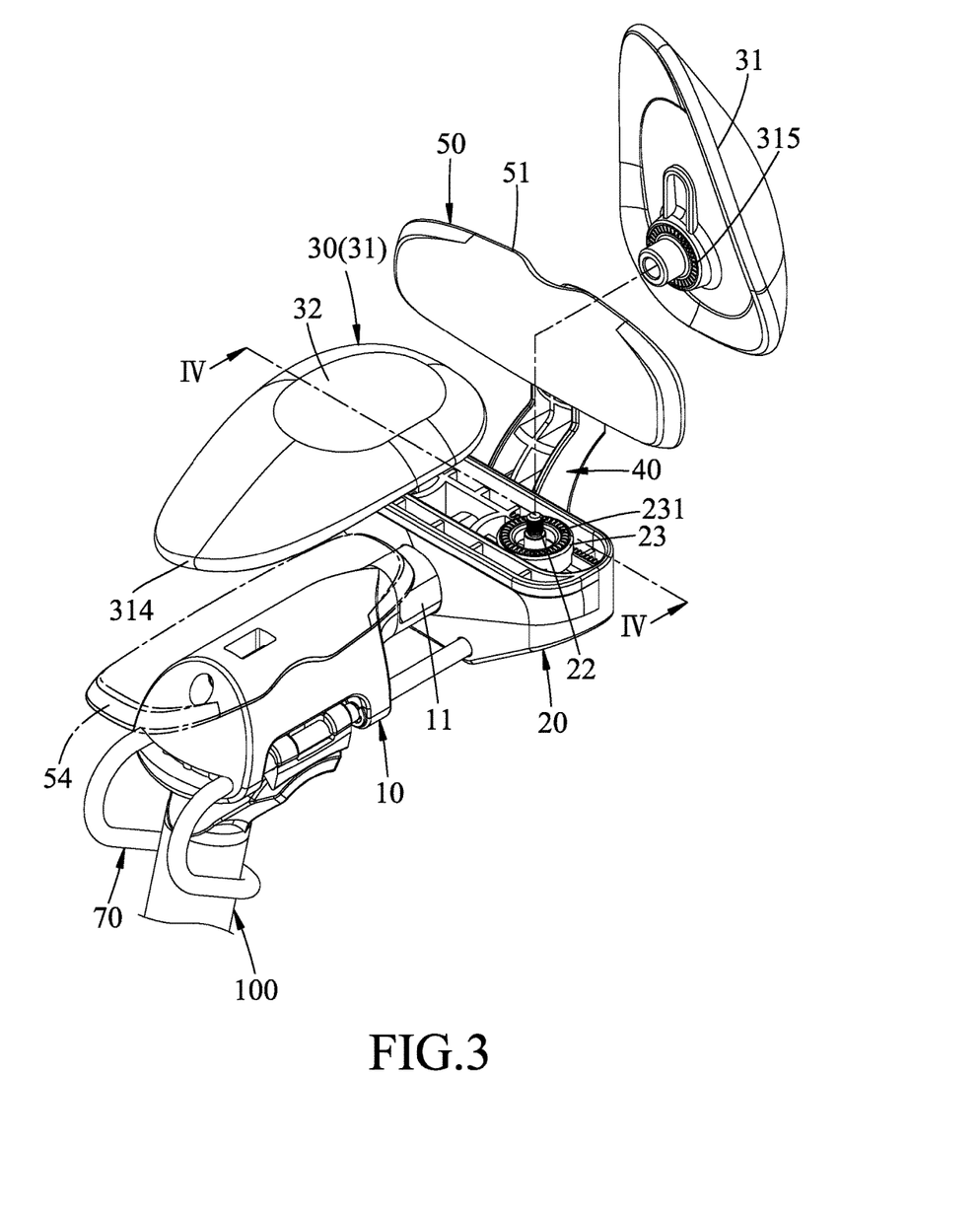
FIG. 3 is another partly exploded perspective view of the first embodiment.
Figure 4:
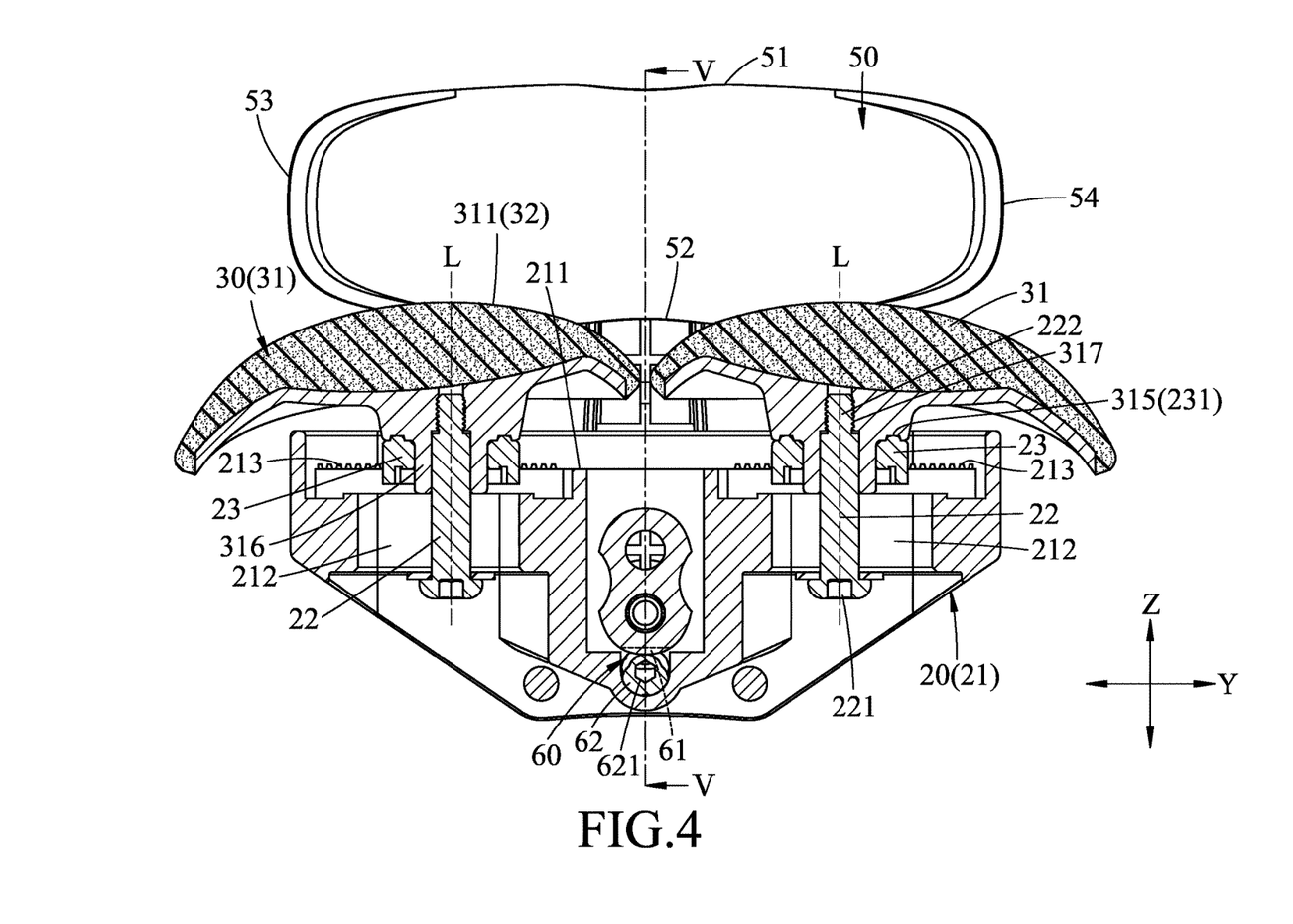
FIG. 4 is a sectional view taken along line IV-IV in FIG. 3.

Referring to FIGS. 1 and 2, the first embodiment of a saddle device according to the disclosure is adapted to be mounted to a seat post 100, and includes a first seat unit 10 connected to a top portion of the seat post 100, a second seat unit 20, a saddle unit 30, an elongate backrest 50, an adjusting unit 60 and a reinforcing frame member 70.

The first seat unit 10 has a track portion 11 extending in a front-rear direction (X), and a front mounting portion 12 disposed in front of the track portion 11. The track portion 11 has a non-circular cross section taken perpendicular to the front-rear direction (X). In this embodiment, the track portion 11 has an 8-shaped cross section, and may be varied in other embodiments. The track portion 11 has a rear end surface 111, and two engaging holes 112 formed in the rear end surface 111, and extending in the front-rear direction (X). The front mounting portion 12 has an engaging groove 121 formed in a top surface thereof. The first seat unit 10 includes a supporting member 40 disposed behind and removably connected to the track portion 11. The supporting member 40 has a coupling end 41 connected to the first seat unit 10, and a rear mounting portion 42 opposite to the coupling end 41, disposed behind the second seat unit 20, and distal from the first seat unit 10. The coupling end 41 is formed with a coupling groove 411 that has a cross section the same as that of the track portion 11, and that engages the track portion 11, and a locking hole 412 communicated with the coupling groove 411. The supporting member 40 includes a screw 413 extending through the locking hole 412 and into the coupling groove 411 to threadedly engage one of the engaging holes 112 of the track portion 11. The rear mounting end portion 42 has two mounting holes 421 juxtaposed in a top-bottom direction (Z) which is perpendicular to the front-rear direction (X), and two fastening holes 422 (see FIG. 5) respectively communicated with the mounting holes 421. In this embodiment, the shape of each of the mounting holes 421 is rectangular, and may be varied in other embodiments.

Referring to FIGS. 2 to 5, the second seat unit 20 is mounted to and disposed behind the first seat unit 10, and is movable on the track portion 11 of the first seat unit 10 in the front-rear direction (X). The second seat unit 20 includes a main body 21, two bolts 22 extending through the main body 21, and two toothed members 23 mounted to the main body 21.

The main body 21 has an upper surface 211, two aligned slide slots 212 formed through the main body 21, and extending in a left-right direction (Y) which is perpendicular to the front-rear direction (X), and two pairs of lower racks 213 (only two of the lower racks 213 which are disposed at rear sides of the slide slots 212 are visible in FIG. 2) extending in the left-right direction (Y), and spaced apart from each other. Each pair of the lower racks 213 are respectively disposed at two sides of the slide slots 212 in the front-rear direction (X).

The bolts 22 respectively and slidably extend through the slide slots 212 of the main body 21. Each of the bolts 22 has a head section 221 abutting against a bottom portion of the main body 21, and a threaded section 222 extending through the corresponding slide slot 212.

Each of the toothed members 23 has an axis (L) which is perpendicular to the front-rear direction (X) and the left-right direction (Y), a lower crown gear portion 231 disposed at a top portion thereof, and centered at the axis (L), and two upper racks 232 disposed at a bottom portion thereof, and respectively meshing with a corresponding pair of the lower racks 213.

The saddle unit 30 is mounted to the second seat unit 20, and includes two saddles 31 respectively corresponding to the toothed members 23 in position, and movable toward and away from each other in the left-right direction (Y). Each of the saddles 31 has an upper end portion having a flat top surface 311, a lower end portion 312 opposite to the upper end portion, a rear end portion 313, a front end portion 314 opposite to the rear end portion 313, an upper crown gear portion 315 disposed at the lower end portion 312, and coaxially corresponding to the lower crown gear portion 231 of a corresponding one of the toothed members 23 in position, and a rod segment 316 extending along the corresponding one of the axes (L) of the toothed members 23, and rotatably extending through the corresponding one of the toothed members 23. The flat top surfaces 311 of the saddles 31 cooperately form a top surface unit 32, and the front end portions 314 of the saddles 31 cooperatively form a front end portion unit 314'. Each of the rod segments 316 of the saddles 31 has a saddle threaded hole 317. The upper crown gear portion 315 of each of the saddles 31 is coaxial with a corresponding one of the saddle threaded holes 317. The bolts 22 respectively and threadedly engage the saddle threaded holes 317 of the saddles 31, so as to allow the lower crown gear portions 231 of the toothed members 23 to respectively mesh with the upper crown gear portions 315 of the saddles 31, thereby preventing the saddles 31 from respectively separating from the toothed members 23, such that each of the bolts 22 can be loosened to allow for an adjustment to a distance between the saddles 31. The upper crown gear portion 315 of each of the saddles 31 meshes with the lower crown gear portion 231 of the corresponding one of the toothed members 23, such that each of the saddles 31 is movable relative to the main body 21 of the second seat unit 20 in the left right direction (Y) for adjusting the positions of the saddles 31 in the left right direction (Y).

Figure 5:
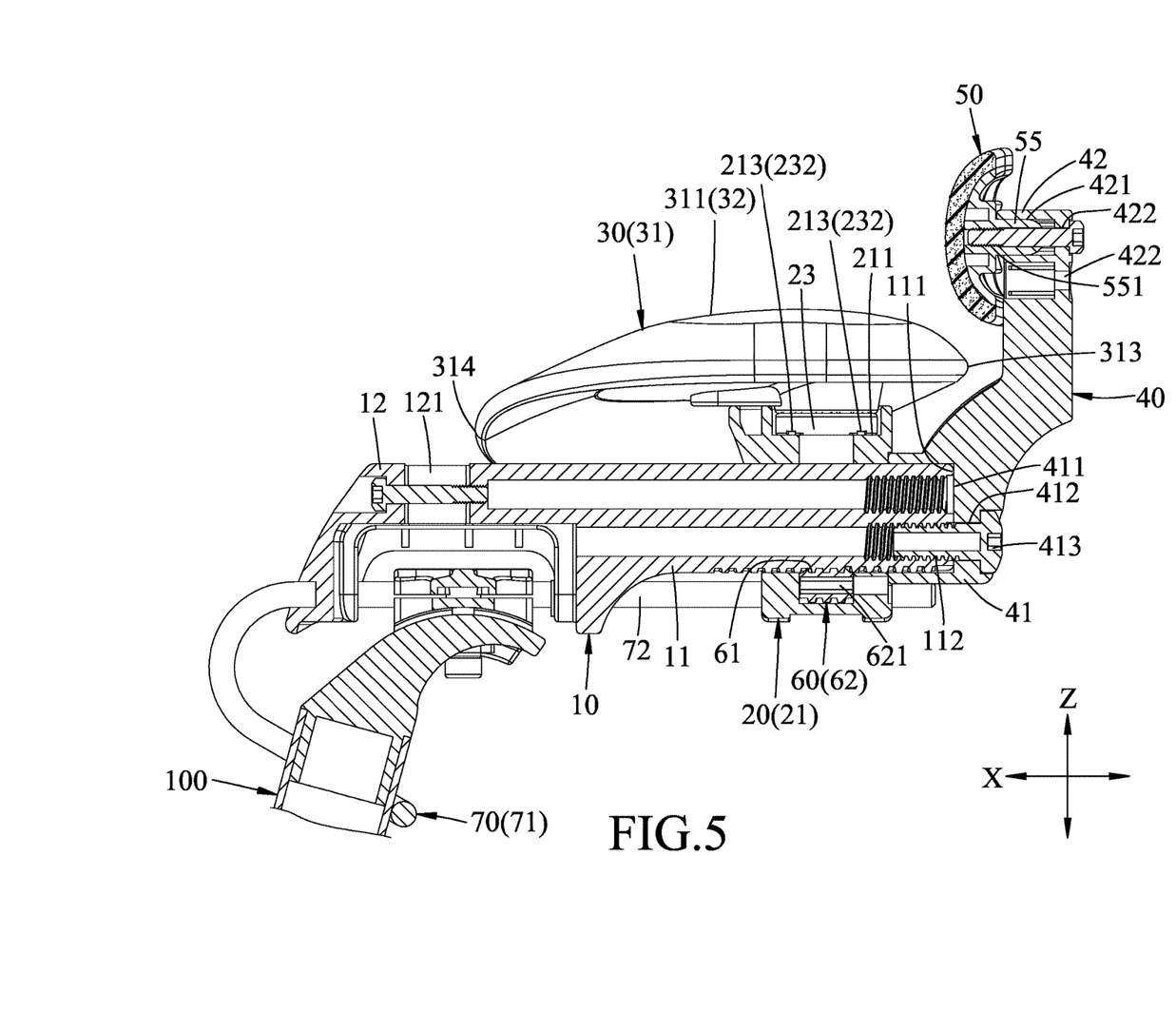
FIG. 5 is a sectional view taken along line V-V in FIG. 4.

The backrest 50 is removably mounted to a selected one of the front mounting portion 12 and the rear mounting portion 42, and has two long sides 51, 52, two short sides 53, 54 connected between the long sides 51, 52, and a connecting block 55 having a backrest threaded hole 551 (see FIG. 5).

The adjusting unit 60 is mounted between the first seat unit 10 and the second seat unit 20, and includes a track rack 61 extending in the front-rear direction (X), and mounted to a bottom portion of the track portion 11 of the first seat unit 10, and a worm 62 mounted to a bottom portion of the main body 21 of the second seat unit 20, meshing with the track rack 61, and operable to drive a relative movement between the second seat unit 20 and the track rack 11 of the first seat unit 10 in the front-rear direction (X). The worm 62 has a hexagonal hole 621 disposed for being engaged by a hex key wrench (not shown). The hex key wrench is operable to rotate the worm 62 to drive the relative movement between the first and second seat units 10, 20 in the front-rear direction (X).

The reinforcing frame member 70 has a U-shaped rod part 71 adapted to be disposed around the seat post 100, and a connecting rod part 72 connected to the U-shaped rod part 71, and securely inserted into the first seat unit 10.

During operation, the supporting member 40 is transformable between a lifted position (see FIG. 1) and a lowered position (see FIG. 6) such that, when the supporting member 40 is at the lifted position, the rear mounting end portion 42 is located above the top surface unit 32 of the saddle unit 30, and when the supporting member 40 is at the lowered position, the rear mounting end portion 42 is located below the top surface unit 32 of the saddle unit 30.

The backrest 50 is mountable to the rear mounting end portion 42 when the supporting member 40 is at the lifted position, such that the long sides 51, 52 are spaced apart from each other in the top-bottom direction (Z), and at least one of the long sides 51, 52 is located above the top surface unit 32 of the saddle unit 30, and is mountable to the front mounting portion 12 when the supporting member 40 is at the lowered position, such that the short sides 53, 54 are spaced apart from each other in the front-rear direction (X), and at least one of the short sides 53, 54 is located in front of the front end portion unit 314' of the saddle unit 30. When the supporting member 40 is at the lifted position, a screw extends through a corresponding one of the fastening holes 422, and threadedly engages the backrest threaded hole 551 to fasten the backrest 50 to the supporting member 40. When the supporting member 40 is at the lowered position, the connecting block 55 engages the engaging groove 121 of the front mounting portion 12. When mounted to the rear mounting end portion 42, the backrest 50 can support the back of a user. Since the backrest 50 is fastened to the rear mounting end portion 42 by the screw, the backrest 50 is prevented from being removed from the supporting member 40.

Figure 6:
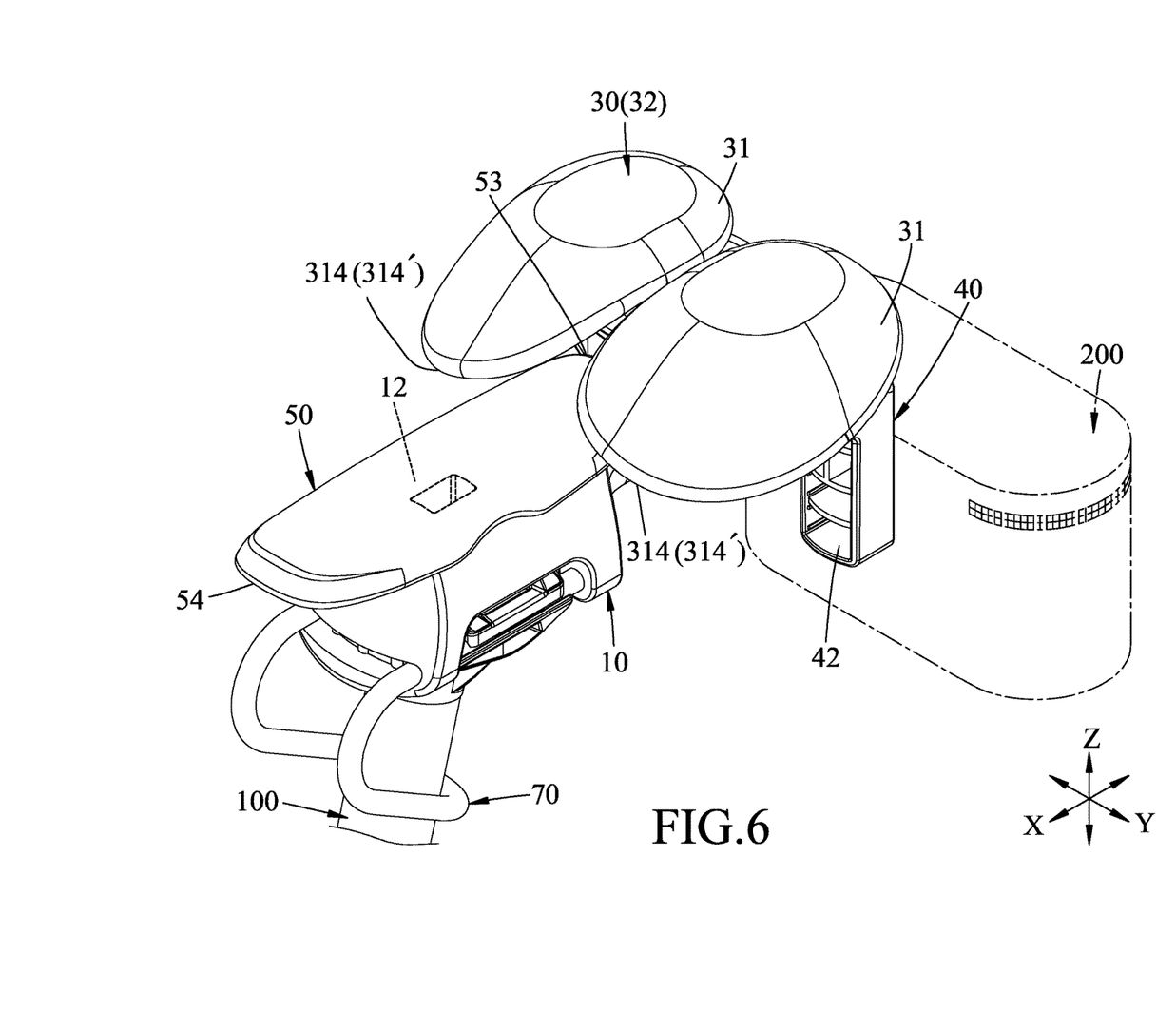
FIG. 6 is a schematic perspective view of the first embodiment, and illustrates that a backrest is mounted to a front mounting portion.

Referring to FIGS. 2, 5 and 6, when the supporting member 40 is required to transform from the lifted position to the lowered position, the user firstly needs to operate the screw 413 to remove the supporting member 40 from the track portion 11. The supporting member 40 is then flipped 180 degrees relative to the first seat unit 10, and is subsequently mounted back to the track portion 11. When the supporting member 40 is at the lowered position, a saddle bag 200 which is disposed for receiving repairing tools, repairing members and a wallet is fastened to the rear mounting end portion 42 by a screw (not shown), and the backrest 50 is fastened to the front mounting portion 12 by another screw, such that the backrest 50 is prevented from being removed from the front mounting portion 12. Therefore, the disposition of the backrest 50 not only increases the support to the saddle unit 30, but also reduces the space occupied when it is not used.

Figure 7:
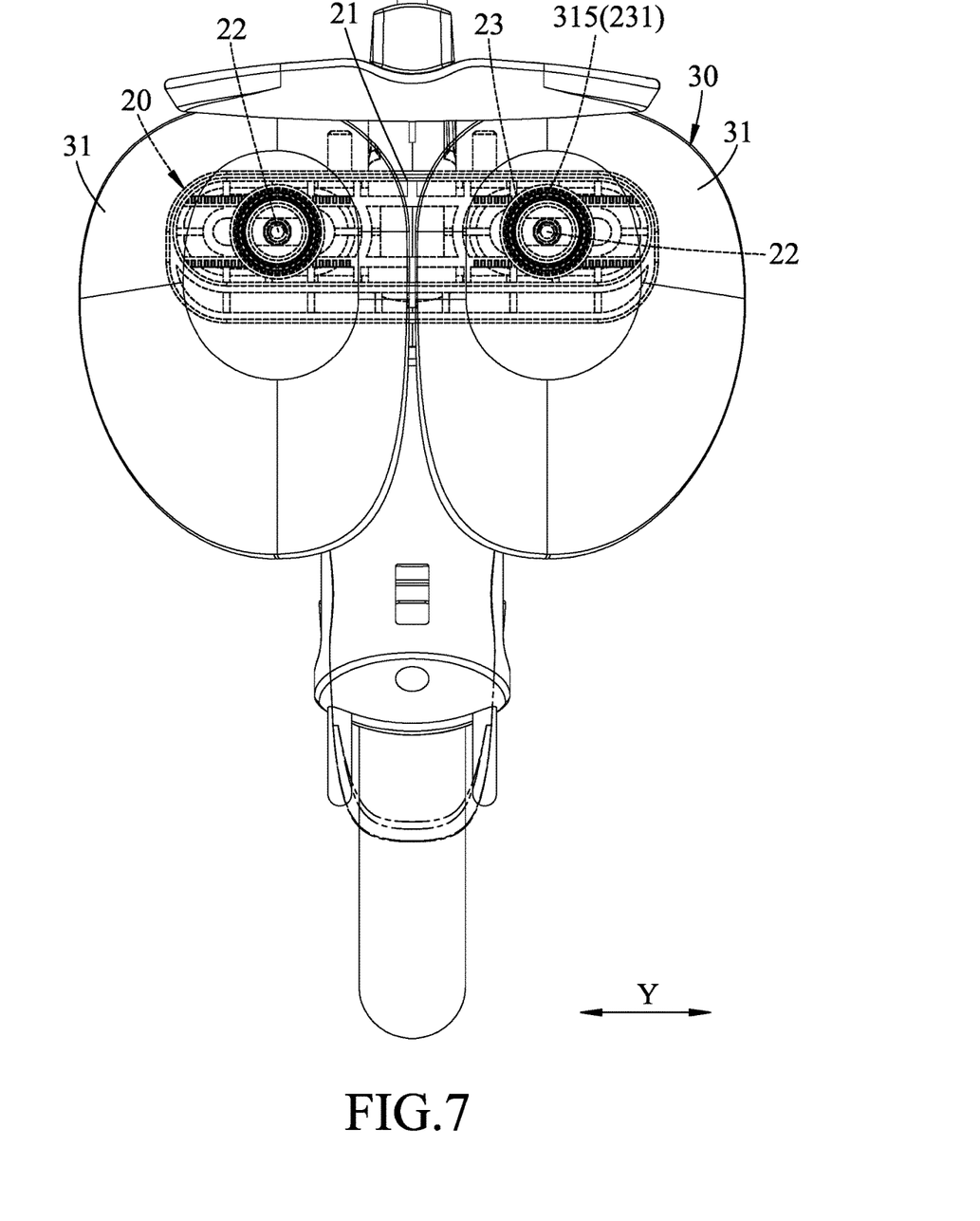
FIG. 7 is a schematic top view of the first embodiment.
Figure 8:
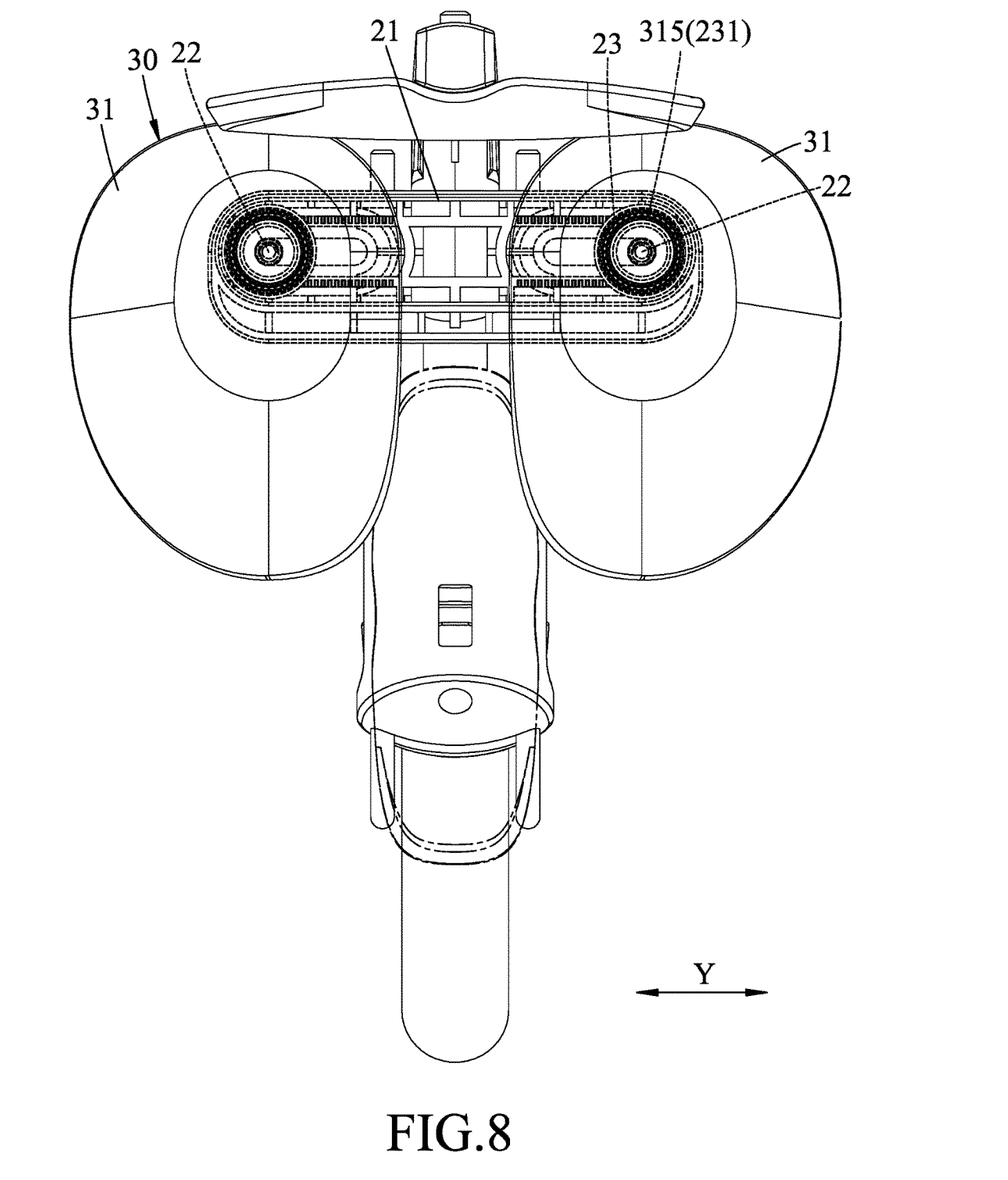
FIG. 8 is a view similar to FIG. 7 but illustrating position adjustment of two saddles.
Figure 9:
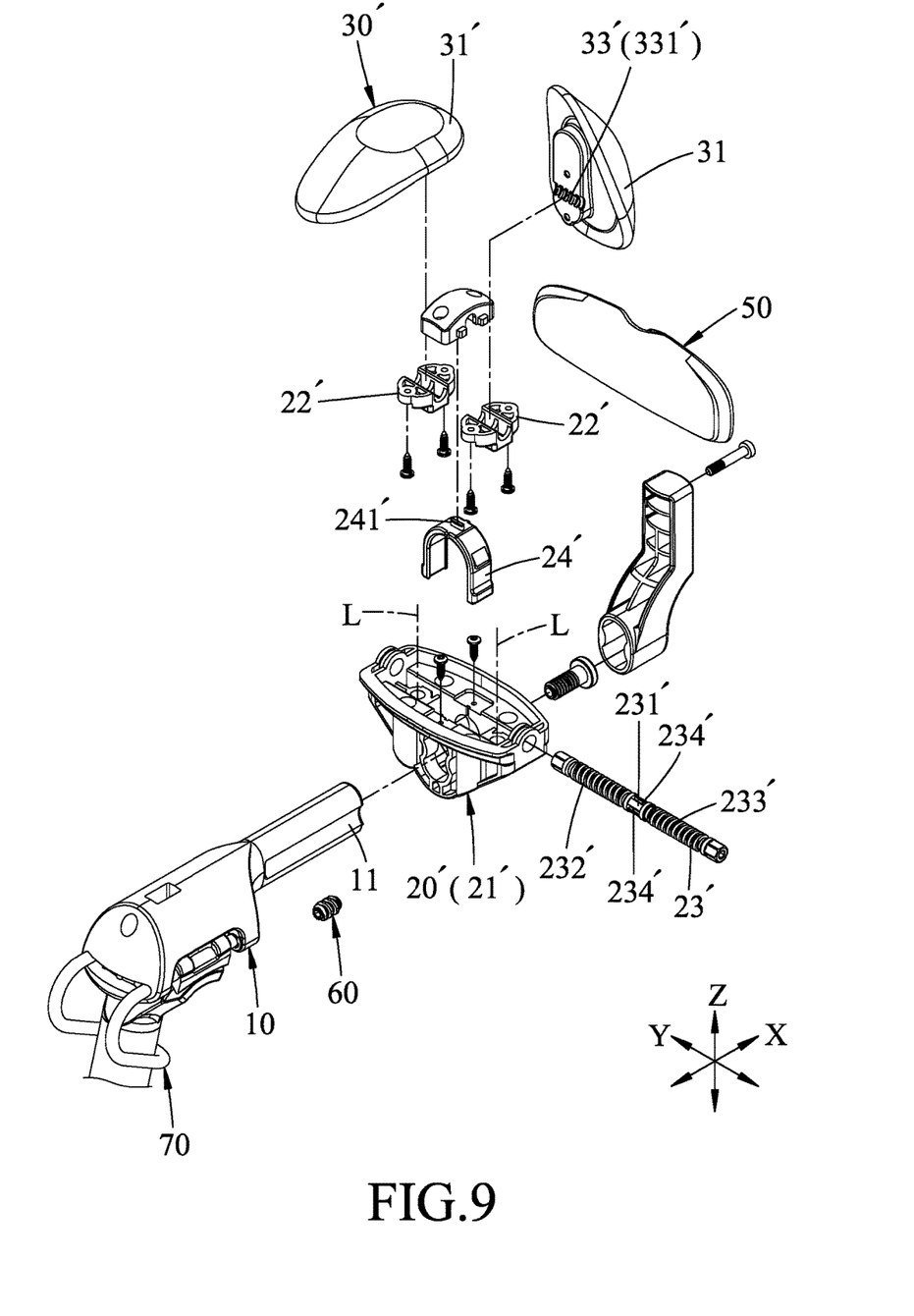
FIG. 9 is a partly exploded perspective view of a second embodiment of the saddle device according to the disclosure.
Figure 10:
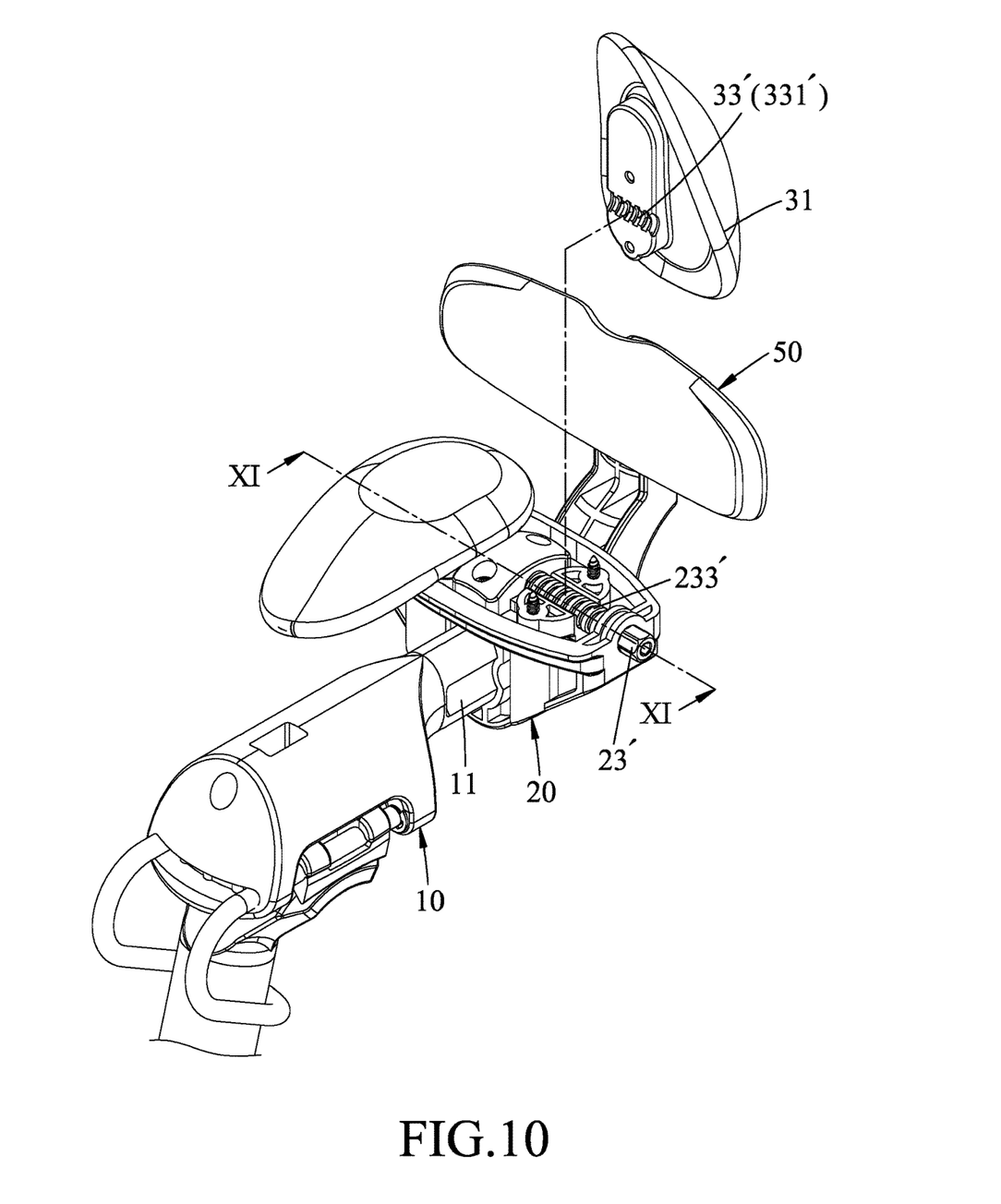
FIG. 10 is another partly exploded perspective view of the second embodiment.
Figure 11:
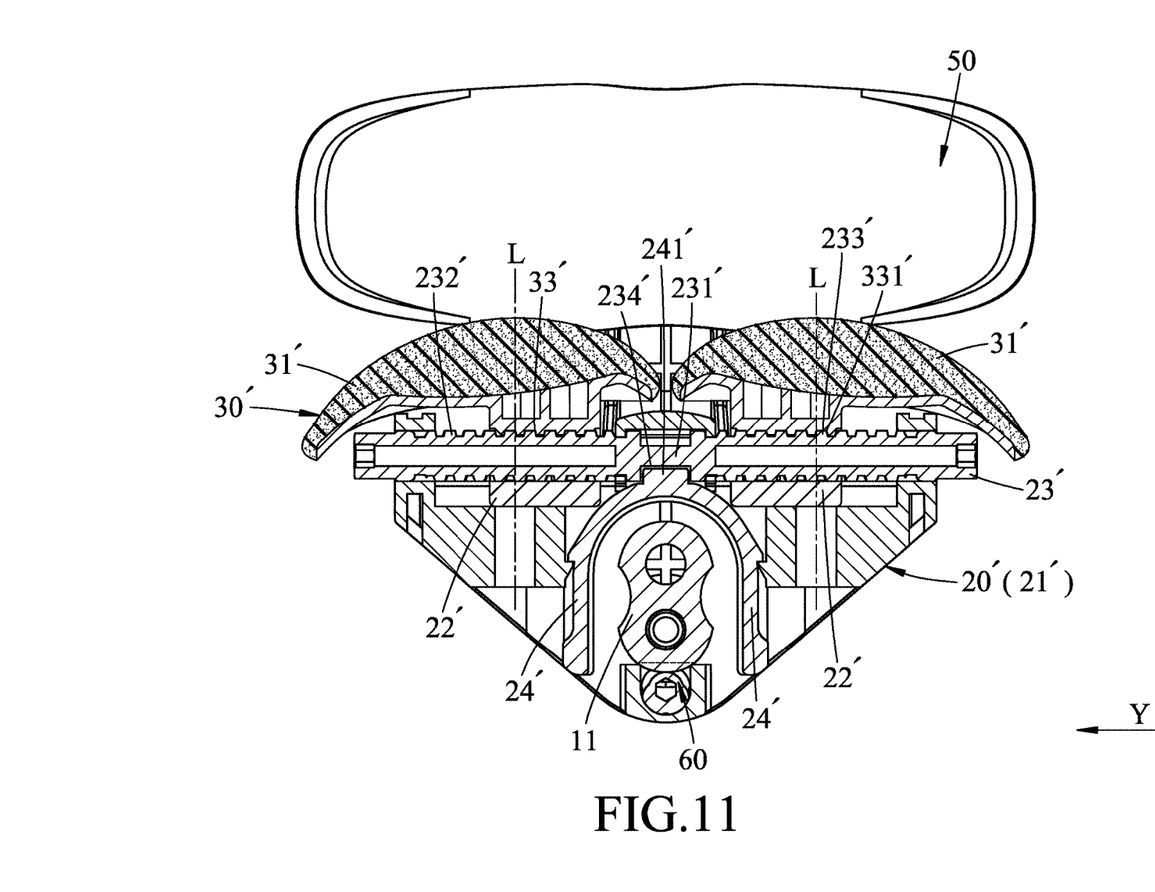
FIG. 11 is a sectional view taken along line XI-XI in FIG. 10.
Figure 12:
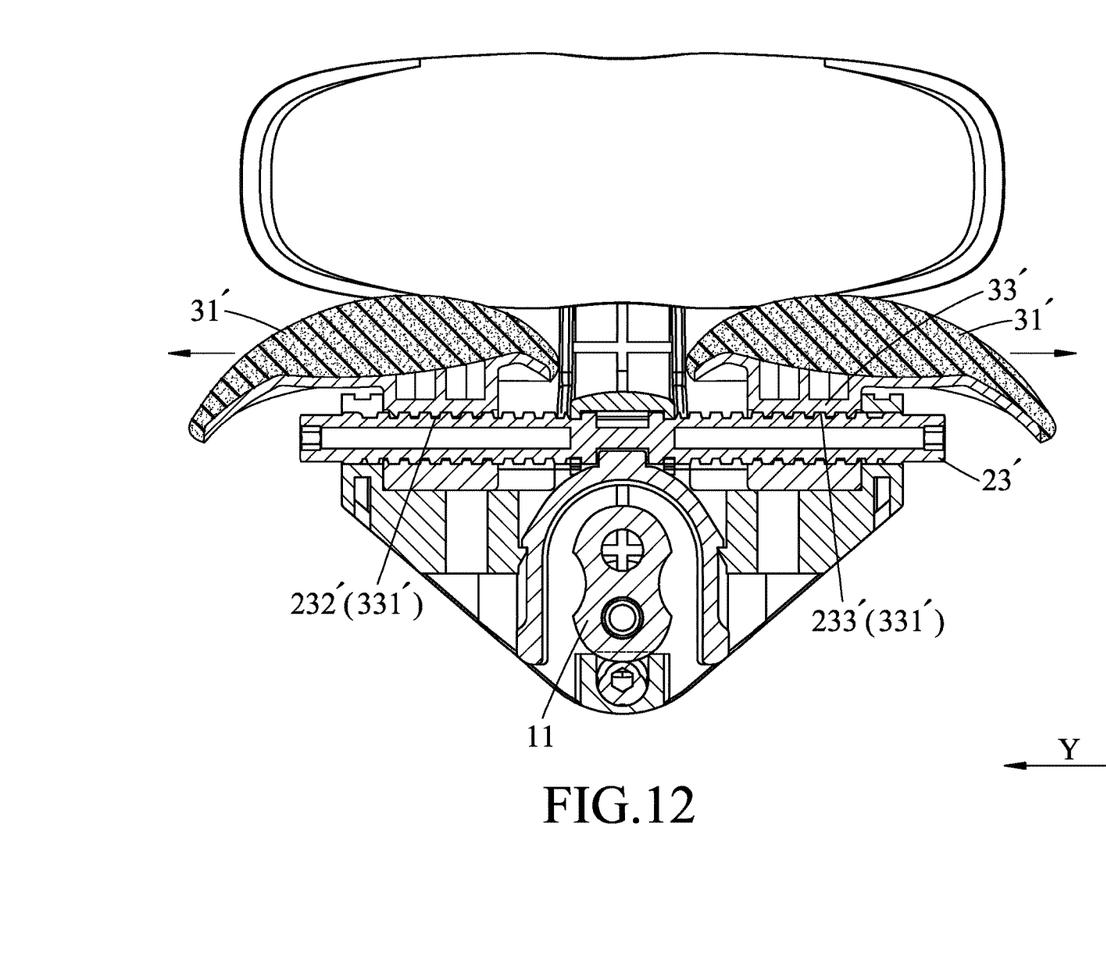
FIG. 12 is a view similar to FIG. 11 but illustrating position adjustment of two saddles.

To adjust the distance between the saddles 31, as shown in FIGS. 7 and 8, the user needs to loosen the bolts 22 first, so that the upper crown gear portions 315 of the saddles 31 can be respectively separate from the lower crown gear portions 231 of the toothed members 23, and so that the upper racks 232 can be respectively separate from the lower racks 213. Subsequently, the saddles 31 are moved toward or away from each other to change the distance between the saddles 31. After the positions of the saddles 31 in the left-right direction (Y) are adjusted, the saddles 31 may be rotated about the bolts 22, respectively, to change the angular positions of the saddles 31 to thereby adjust the distance between the front end portions 314 of the saddles 31 and the distance between the rear end portions 313 of the saddles 31. After the angular positions of the saddles 31 are adjusted, the bolts 22 are tightened. At this moment, the upper crown gear portions 315 of the saddles 31 respectively engage the lower crown gear portions 231 of the toothed members 23, so as to maintain the angular positions of the saddles 31, and the upper racks 232 respectively engage the lower racks 213, so as to maintain the positions of the saddles 31 in the left-right direction (Y).

As shown in FIG. 5, to adjust the positions of the second seat unit 20 and the saddle unit 30 on the track portion 11, the user needs to operate the hex key wrench to rotate the worm 62 to drive the relative movement between the second seat unit 20 and the first seat unit 10.

It should be noted that, the shape of the saddles 31 may be varied based on different physiological conditions in other embodiments.

Referring to FIGS. 9 to 12, the second embodiment of the saddle device according to the disclosure has a structure similar to that of the first embodiment. The main difference between this embodiment and the previous embodiment resides in the configuration of the second seat unit 20' and the saddle unit 30'.

The second seat unit 20' includes a main body 21', two guiding members 22' movably mounted to the main body 21', a screw member 23' rotatably mounted to the main body 21', and a resilient positioning member 24' mounted to the main body 21'. The screw member 23' extends in the left-right direction (Y), and has a middle segment 231', a left-handed threaded segment 232' connected to one end of the middle segment 231', and a right-handed threaded segment 233' connected to the other end of the middle segment 231'. The middle segment 231' has a plurality of axially extending positioning grooves 234'.

The resilient positioning member 24' is inverted U-shaped, and has two lower ends abutting against the main body 21', and an engaging portion 241' disposed at an upper end of the resilient positioning member 24', and biased to press against the screw member 23' and engage one of the positioning grooves 234' of the screw member 23'.

The saddle unit 30' includes two saddles 31' respectively secured to the guiding members 22'. Each of the saddles 31' has a threaded portion 33' disposed at a bottom portion thereof. The threaded portions 33' of the saddles 31' respectively engage the left-handed threaded segment 232' and the right-handed threaded segment 233' of the screw member 23', and are operable to drive rotation of the screw member 23', such that the saddles 31' are movable toward and away from each other in the left-right direction (Y) for adjusting a distance between the saddles 31'. When the engaging portion 241' of the resilient positioning member 24' is biased into one of the positioning grooves 234' of the screw member 23', the relative position of the saddles 31' can be maintained.

The second embodiment has the same advantages as those of the first embodiment.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A saddle device comprising:
   a first seat unit having a track portion that extends in a front-rear direction, a front mounting portion that is disposed in front of said track portion, and a rear mounting end portion that is located opposite to said front mounting portion in the front-rear direction, and that is located behind said track portion;
   a second seat unit mounted to and disposed behind said first seat unit, and movable on said first seat unit in the front-rear direction;
   a saddle unit mounted to said second seat unit, and having a front end portion unit and a top surface unit; and
   an elongate backrest removably mounted to said seat unit, and having two long sides, and two short sides that are connected between said long sides,
   wherein, when said backrest is mounted to said front mounting portion of said seat unit, said short sides are spaced apart from each other in the front-rear direction, and at least one of said short sides is located in front of said front end portion unit of said saddle unit, and when said backrest is mounted to said rear mounting end portion of said seat unit, said long sides are spaced apart from each other in a top-bottom direction which is perpendicular to the front-rear direction, and at least one of said long sides is located above said top surface unit of said saddle unit.

2. The saddle device as claimed in claim 1, further comprising an adjusting unit mounted between said first seat unit and said second seat unit, and including a track rack that extends in the front-rear direction, and that is mounted to said track portion of said first seat unit, and a worm that is mounted to said second seat unit, that meshes with said track rack, and that is operable to drive a relative movement between said second seat unit and said track rack of said first seat unit in the front-rear direction.

3. The saddle device as claimed in claim 1, wherein:
said saddle unit includes two saddles mounted to said second seat unit, and movable toward and away from each other in a left-right direction which is perpendicular to the front-rear direction;
each of said saddles has an upper end portion having a flat top surface, a lower end portion opposite to said upper end portion, and a front end portion; and
said flat top surfaces of said saddles cooperatively form said top surface unit, said front end portions of said saddles cooperatively forming said front end edge unit.

4. The saddle device as claimed in claim 3, wherein:
said second seat unit includes a main body, and two toothed members mounted to said main body;
said main body includes two pairs of lower racks extending in the left-right direction, and spaced apart from each other;
each of said toothed members has an axis which is perpendicular to the front-rear direction and the left-right direction, a lower crown gear portion disposed at a top portion thereof, and centered at the axis, and two upper racks disposed at a bottom portion thereof, and respectively meshing with a corresponding pair of said lower racks;
said saddles respectively correspond to said toothed members in position;
each of said saddles further has an upper crown gear portion disposed at said lower end portion, and coaxially corresponding to said lower crown gear portion of a corresponding one of said toothed members in position; and
said upper crown gear portion of each of said saddles meshes with said lower crown gear portion of the corresponding one of said toothed members, such that each of said saddles is movable relative to said main body of said second seat unit in the left-right direction for adjusting the positions of said saddles in the left-right direction.

5. The saddle device as claimed in claim 4, wherein:
said main body of said second seat unit has an upper surface, two aligned slide slots formed through said main body, and extending in the left-right direction;
each pair of said lower racks are respectively disposed at two sides of said slide slots in the front-rear direction;
said second seat unit further includes two bolts respectively and slidably extending through said slide slots;
each of said saddles further has a saddle threaded hole, said upper crown gear portion of each of said saddles being coaxial with a corresponding one of said saddle threaded holes; and
said bolts respectively engage said saddle threaded holes of said saddles, so as to allow said lower crown gear portions of said toothed members to respectively mesh with said upper crown gear portions of said saddles, thereby preventing said saddles from respectively separating from said toothed members, such that each of said bolts can be loosened to allow for an adjustment to a distance between said saddles.

6. The saddle device as claimed in claim 1, wherein:
said second seat unit includes a main body, two guiding members movably mounted to said main body, and a screw member rotatably mounted to said main body;
said screw member extends in a left-right direction which is perpendicular to the front-rear direction, and has a middle segment, a left-handed threaded segment connected to one end of said middle segment, and a right-handed threaded segment connected to the other end of said middle segment;
said saddle unit includes two saddles respectively secured to said guiding members, each of said saddles having a threaded portion that is disposed at a bottom portion of a corresponding one of said saddles;
said threaded portions of said saddles respectively mesh with said left-handed threaded segment and said right-handed threaded segment, and are movable relative to said main body to drive rotation of said screw member, such that said saddles are movable toward and away from each other in the left-right direction for adjusting a distance between the saddles.

7. The saddle device as claimed in claim 6, wherein:
said second seat unit further includes a resilient positioning member mounted to said main body, and having an engaging portion;
said middle segment of said screw member has a plurality of axially extending positioning grooves; and
said engaging portion of said resilient positioning member is biased to press against said screw member and engages one of said positioning grooves of said screw member, so as to maintain positions of said saddles relative to each other.

8. The saddle device as claimed in claim 1 being adapted to be mounted to a seat post, said first seat unit being connected to a top portion of the seat post, said saddle device further comprising:
a reinforcing frame member having a U-shaped rod part that is adapted to be disposed around the seat post, and a connecting part that is connected to said U-shaped rod part, and that is securely inserted into said first seat unit.

9. The saddle device as claimed in claim 1, wherein:
said first seat unit includes a supporting member having said rear mounting end portion that is disposed behind said second seat unit, a coupling end that is located opposite to said rear mounting end portion, and that is connected to said first seat unit; and
said supporting member is transformable between a lifted position and a lowered position such that, when said supporting member is at the lifted position, said rear mounting end portion is located above said top surface unit of said saddle unit, and when said supporting member is at the lowered position, said rear mounting end portion is located below said top surface unit of said saddle unit.

* * * * *